United States Patent [19]

Nalewajek

[11] Patent Number: 4,895,778
[45] Date of Patent: Jan. 23, 1990

[54] METHOD OF PURIFYING ELECTROLYTES OF ALKALI METAL BATTERIES

[75] Inventor: David Nalewajek, West Seneca, N.Y.

[73] Assignee: Allied-Signal Inc., Morristown, N.J.

[21] Appl. No.: 912,697

[22] Filed: Sep. 29, 1986

Related U.S. Application Data

[63] Continuation of Ser. No. 756,857, Jul. 18, 1985, abandoned.

[51] Int. Cl.$^4$ .......................... H01M 6/04; C02F 5/42
[52] U.S. Cl. .................................. 429/188; 429/194; 210/688; 210/912
[58] Field of Search ................ 429/188; 210/688, 732, 210/912

[56] References Cited

PUBLICATIONS

Dorfner, *Ion Exchangers* Ann Arbor Science Publishers, 5/1972, section 3.2.
Colella, "Synthesis, Characterization, and Analytical Applications of a Poly(Acrylamidoxime) Metal Chelating Resin", Dissertation Abstracts International, vol. 41, No. 7, Jan./1981.
Morrison and Boyd, *Organic Chemistry*, Allyn and Bacon, Inc., pp. 591, 617.

*Primary Examiner*—Stephen J. Kalafut
*Attorney, Agent, or Firm*—Jay P. Friedenson

[57] ABSTRACT

A method is described for purifying elecrolytes used in alkali battery systems and containing transition metal solutes as impurities. An electrolyte is mixed with or fed through a column containing poly(acrylamideoxime) resin. The resin chelates the transition metal solute impurities found in typical organic solvents.

Electrolytes so treated exhibit improved electrochemical properties because the electrolyte is now devoid of impurities deleterious to battery performance.

The solution to be purified can consist of either the organic solvent or the solvent containing at least one alkali salt solute. The purification comprises the steps of (a) adding the solvent or electrolyte solution to a chelating resin; (2) agitating the solution sufficiently to allow chelation of the metal impurities on the resin (when performed in a batch process) or eluting the solution through a pre-formed bed (when performed continuously in a column process). Either of these two procedures will remove the transition metal impurities to a sufficiently low enough level that they will no longer adversely effect cell performance.

20 Claims, 1 Drawing Sheet

METHOD OF PURIFYING ELECTROLYTES OF ALKALI METAL BATTERIES

This application is a continuation of application Ser. No. 756,857, filed July 18, 1985, now abandoned.

This invention relates to a method of purifying organic solvents and/or electrolyte solutions for use in non-aqueous cells containing an active metal anode.

BACKGROUND OF THE INVENTION

A variety of batteries employing active metal anodes are known. Illustrative of batteries of this kind in the prior art are those disclosed, for example, in U.S. Pat. Nos. 3,514,337; 3,536,532; 3,700,502 and 3,892,590. A variety of electrolytes can be used in the fabrication of these systems.

It is recognized by those skilled in the art, that the discharge performance of non-aqueous cells containing an active metal anode can be significantly affected by the purity of the solvent and/or electrolyte solution. The presence of even trace impurities can adversely affect the performance and stability of the battery system. Transition metals or metal salt impurities such as nickel, iron, and copper or any electroactive compound can produce a variety of reduced or oxidized species This can result in self-discharge (poor shelf life) and poor voltaic performance of the cell. Numerous methods have been proposed to remove these impurities, however, most known prior attempts are time consuming and expensive Typical of known methods seeking to eliminate impurities include galvanostatic pre-electrolysis; various distillation techniques, e.g., vacuum distillation, atmospheric distillation and spinning band distillation, treatment with absorbants, such as activated carbon or alumina; and fractional crystallization. Frequently, it is necessary to use combination of the above techniques in an effort to obtain a solvent of suitable purity for use in non-aqueous cells.

It is the purpose of this invention, accordingly, to disclose a simple relatively practical and efficient process for removing such metal/metal salt impurities from organic solvents and/or electrolyte systems which are to be used for the fabrication of various non-aqueous cells

SUMMARY OF THE INVENTION

In accordance with the invention a method is provided for purifying an electrolyte solution of an electrolyte solvent for use in an alkali metal battery. The solution to be purified may be either the organic solvent or the solvent containing at least one contaminant metal selected from copper, nickel and iron solute and at least one alkali salt solute.

The method of the invention comprises the steps of: (1) adding the solvent or electrolyte solution to a chelating resin; and (2) agitating the solution sufficiently to allow chelation of the metal impurities on the resin (when performed in a batch process) or eluting the solution through a preformed bed (when performed in a continuous, e.g., column process). The use of either the batch or column procedure removes the transition metal impurities to a sufficiently low enough level that, to the extent that any residual amounts of impurity is present, it will no longer adversely effect cell performance. Of the two methodologies, the batch method is preferred since it requires less time (on a through-put basis).

Chelating resins incorporating oxime functionalities form an interesting and useful class of polymeric ligands because of their strong binding properties. Although numerous examples of these as well as of the ion exchange resins are known, their use according to my discovery for preparing ultra pure solvents for alkali battery fabrication has not been known. Stringent criteria as discussed below have eliminated the use of many of the commercially available resins.

I have discovered that poly(acrylamideoxime) is suitable for use as a purification medium and offers distinct advantages over other materials.

An important aspect of the system of the invention is the ability of the system to coordinate with a transition metal without the dissociation of another ionic species, i.e.

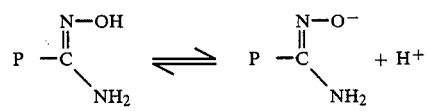

The characteristic difference between poly(acrylamideoxime) and other chelate resins of ion exchange resins is that upon chelation this resin does not dissociate as indicated above. That is to say, the stoichiometric process of ion replacement for each ion of bound transition metal does not occur. Instead, sorption without replacement predominates. The mode of coordination that is believed to take place is illustrated below:

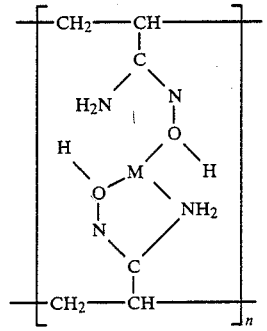

Another important property of this resin is its high selectivity. No affinity for the alkali or alkaline earth metals is observed. In addition, despite the high concentration of the alkali metals, the kinetics of the resin-metal interaction is sufficiently rapid for coordination (removal) of trace transition metals. Since most electrolyte solutions contain on the order of 1 molar alkali salt as an ion transport medium, preference for the alkali would result in saturation of the binding sites and loss of specificity. It is found that only chelation of the transition metals occurs.

Poly(acrylamideoxime) also exhibits superior stability towards organic solvents In all solvents tested, there was no appreciable dissolution of the resin. It is essential that no additional organic impurities be introduced since they may be incompatible with respect to the electrochemistry or cell components of the system. Oxidized or reduced species could be produced resulting in formation of products which could further react with the cathode or the anode. The result would be poor shelf life, poor voltaic performance or cell fatigue.

Additionally, poly(acrylamideoxime) is advantageously prepared from low cost materials and the method of synthesis produces a consistent material with respect to resin capacity and kinetics.

The advantages of the invention will become more apparent and will be better understood by referring to the following detailed description considered in conjunction with the figures of the drawing and accompanying examples.

The two curves compare the discharge profile for a non-aqueous $CF_x$/Li cell using propylene carbonate/dimethoxyethane /$LiBF_4$ electrolyte before and after the nickel impurity was removed.

Figure 2:
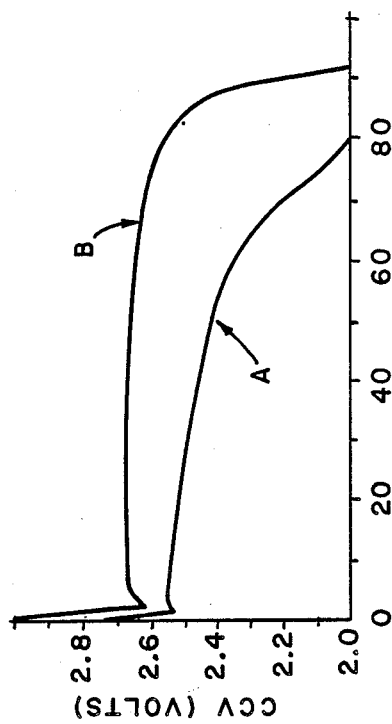

FIG. 2 compares the discharge profile for a non-aqueous $CF_x$/Li cell using propylene carbonate/dimethoxyethane /$LiBF_4$ electrolyte before and after the copper impurity was removed.

Figure 3:
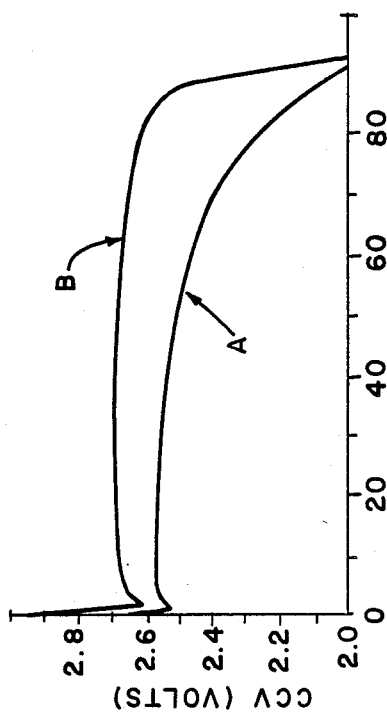

FIG. 3 compares discharge profile for a non-aqueous $CF_x$/Li cell using propylene carbonate/dimethoxyethane $LiBF_4$ electrolyte before and after the iron (2+) impurity was removed.

Figure 4:
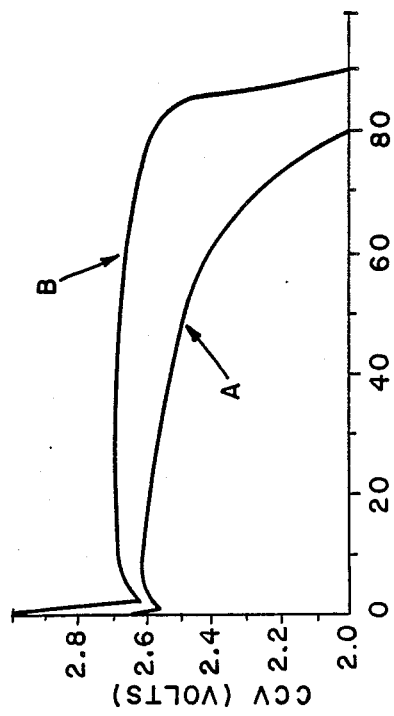
Figure 1:
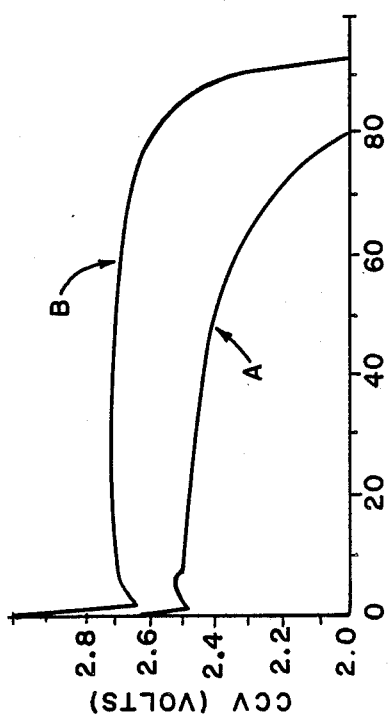
FIG. 1 is a diagram of closed cell voltage (CCV) versus depth of discharge (DOD) where Curve A represents the discharge performance of cells fabricated with untreated electrolyte and Curve B represents the discharge performance after treatment.

FIG. 4 compares the discharge profile for a non-aqueous $CF_x$/Li cell using propylene carbonate/dimethoxyethane /$LiBF_4$ electrolyte before and after the iron (3+) impurity was removed.

DESCRIPTION OF THE PREFERRED EMBODIMENTS

This invention provides a novel method for the purification of solvents or electrolyte solutions to be used in fabrication of non-aqueous alkali metal cells. The purification is accomplished by slurrying or eluting the contaminated solutions through a chelating resin comprised of poly(acrylamideoxime). Although this resin exhibits affinity for most of the transition metals, its specificity for copper, nickel and iron was preferentially studied, as these metals have been identified by those skilled in the art as particularly troublesome in battery systems. Solvent systems investigated included typical organic compounds known to be useful for battery application and were chosen from the group consisting of:

Lactones: e.g. γ-butyrolactone;

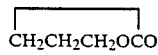

Alkylene carbonates: e.g. propylene carbonate;

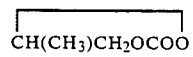

Lactams: e.g. N-methylpyrrolidinone;

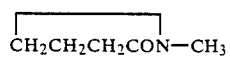

Polyethers: e.g. 1,1 and 1,2-dimethoxyethane
Cyclic ethers: e.g. tetrahydrofuran Cyclic sulfones: e.g. sulfolane

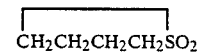

Dialkylsulfites: e.g. dimethylsulfite
Monocarboxylic acid esters: e.g. ethyl or methyl aceate, methyl formate
Alkylnitriles: e.g. acetonitrile The poly(acrylamideoxime) chelate resin used in the method of the present invention was prepared by the method of W. Sorenson, et al. as described in "Preparative Methods in Polymer Chemistry", Interscience Publishers, New York, 1961, p. 171 which is hereby Inc., incorporated by reference.

In a typical synthesis, approximately one kilogram of resin was produced. Five batches of resin were manufactured and tested over a six month period to determine reproducibility, stability on storage and change in activity. No variation was observed, the material showed no signs of decomposition and it continued to exhibit high selectivity over this time period.

The selectivity of the resin for the transition metals alluded to above as well as for the alkali metals, particularly lithium, was evaluated by contacting the resin with the electrolyte solution. Standard stock solutions contaminated with on the order of 100 ppm iron, nickel and copper metal halides were investigated. Table 1 summarizes the results for a 50/50 by volume mixture of dimethoxyethane/propylene carbonate dimethoxyethane, γ-butyrolactone, and propylene carbonate solution containing one molar lithium tetrafluoroborate as electrolyte.

TABLE 1

| Solvent | ppm Fe | ppm Ni | ppm Cu | ppm Li |
|---|---|---|---|---|
| propylene carbonate (stock) | 110.0 | 103.0 | 114.0 | 10,200 |
| propylene carbonate (treated) | 4.2 | 12.0 | 8.0 | 10,200 |
| dimethoxyethane (stock) | 118.0 | 105.0 | 91.0 | 10,700 |
| dimethoxyethane (treated) | 18.0 | 2.1 | 2.7 | 10,700 |
| propylene carbonate/dimethoxyethane (stock) | 123.0 | 104.0 | 105.0 | 10,200 |
| propylene carbonate/dimethoxyethane (treated) | 4.0 | 2.0 | 2.0 | 10,200 |
| γ-butyrolactone (stock) | 101.0 | 94.0 | 99.0 | 10,000 |
| γ-butyrolactone (treated) | 5.1 | 0.1 | 3.0 | 10,000 |

After six months, the stock solutions were once again treated with the resin. The results are summarized in Table 2.

TABLE 2

| Solvent | ppm Fe | ppm Ni | ppm Cu |
|---|---|---|---|
| propylene carbonate | 3.0 | 9.0 | 6.2 |
| dimethoxyethane | 10.0 | 1.4 | 2.0 |
| 50/50 propylene carbonate/dimethoxyethane | 3.0 | 5.3 | 0.27 |
| γ-butyrolactone | 0.1 | <.1 | 0.1 |

As seen, the uptake of trace metals was found to be 92% or greater for the metals studied. Futher, it is observed that no affinity for lithium occurred. Therefore, this resin is appropriate for removing transition metals from organic solvents containing a high electrolyte content. No change in the activity of the resin was observed as is substantiated from the data in the tables.

Finally, the eluent from the resin showed no indication of trace organic impurities introduced from the process.

The results of this investigation indicate that poly(acrylamideoxime) meets all the necessary requirements specified above and provides a distinctly advantageous improvement over known prior art systems.

As a final test, a battery was constructed using an electrolyte before and after purification by the methods disclosed in accordance with the system of the present invention.

In FIGS. 1-4, Curve A represents the discharge performance of cells fabricated with untreated electrolyte, while Curve B perpesents the discharge performance of cells fabricated with purified electrolyte.

The following observations can be deduced by making reference to Table 3 and FIGS. 1-4: a 5-16% increase in the closed circuit voltage; a 12-24% increase in the specific energy of the system; a leveling off of the discharge profile at higher voltages, and an increase in utilization of the cathode active component. These observations are acknowledged by those skilled in the art as significant improvements in the voltaic performance for these non-aqueous cells.

TABLE 3

Discharge Performance of Carbonfluoride Non-Aqueous Cells Before and After Solvent Purification

| Solvent/Transition Metal Impurity | CCV @ Various % DOD | | | Energy mWH/g |
|---|---|---|---|---|
| | 20% | 50% | 66.7% | |
| PC/DME/Cu (before) | 2.56 | 2.51 | 2.42 | 1908 |
| PC/DME/Cu (after) | 2.70 | 2.69 | 2.66 | 2137 |
| PC/DME/Ni (before) | 2.59 | 2.50 | 2.34 | 1695 |
| PC/DME/Ni (after) | 2.69 | 2.67 | 2.64 | 2050 |
| PC/DME/Fe(2+) (before) | 2.48 | 2.40 | 2.27 | 1685 |
| PC/DME/Fe(2+) (after) | 2.69 | 2.68 | 2.64 | 2127 |
| PC/DME/Fe(3+) (before) | 2.52 | 2.42 | 2.28 | 1701 |
| PC/DME/Fe(3+) (after) | 2.69 | 2.67 | 2.64 | 2117 |

PC = propylene carbonate; DME = dimethoxyethane; Electrolyte comprised of 1 molar LiBF$_4$ in 50/50 PC/DME.

The following examples are provided to better illustrate the advantages of this invention. It will be understood, however, although these examples may describe in detail certain preferred operation conditions of the invention, they are given primarily for purposes of illustration and the invention in its broader aspect is not limited thereto.

EXAMPLE 1

POLY(ACRYLAMIDEOXMIME)

A 10L flask, containing 6L of dimethylformamide and 1 Kg of polyacrylonitrile, was equipped with a mechanical stirrer and maintained at a temperature of 75° C. 400 g of hydroxylamine hydrochloride and 300 g of anhydrous sodium carbonate were added to the flask and the resulting mixture stirred and heated for 3 hours. The polymer solution was filtered, precipitated into methanol, and the product washed with methanol and dried. The polymer yield is quantitative.

EXAMPLE 2

A contaminated stock solution consisting of a 50/50 by volume mixture of propylene carbonate/dimethoxyethane (1 molar) in lithium tetrafluoroborate was contacted with excess chelating resin and allowed to stir for one hour. The initially yellow solution was filtered to yield a colorless solution which was used for subsequent battery fabrication. The results of trace metal analysis are presented in Table 1 above.

EXAMPLE 3

A contaminated stock solution of propylene carbonate, 1 molar in lithium tetrafluoroborate was contacted with excess chelating resin and allowed to stir for one hour. The initially yellow solution was filtered to yield a colorless solution which was used for subsequent battery fabrication. The results of trace metal analysis are presented above in Table 1.

EXAMPLE 4

A contaminated stock solution of dimethoxyethane, 1 molar in lithium tetrafluoroborate was contacted with excess chelating resin and allowed to stir for one hour. The initially yellow solution was filtered to yield a colorless solution which was used for subsequent battery fabrication. The results of trace metal analysis are presented in Table 1 above.

EXAMPLE 5

A contaminated stock solution of γ-butyrolactone, 1 molar in lithium tetrafluoroborate was contacted with excess chelating resin and allowed to stir for one hour. The initially yellow solution was filtered to yield a colorless solution which was used for subsequent battery fabrication. The results of trace metal analysis are presented in Table 1 above.

EXAMPLE 6

A column of dimensions 1×12 inch was filled with the chelating resin. The electrolyte consisting of one molar solutions of lithium tetrafluoroborate and dimethoxyethane, propylenecarbonate, 50/50 mixtures of dimethoxyethane/propylenecarbonate or γ-butyrolactone were passed through at a rate such that 25 mL of purified material was collected after one hour. The results of trace metal analysis were in the range cited for the batch process as listed in Table 1 above.

EXAMPLE 7

Experimental cells were constructed using a lithium anode, a 1 molar lithium tetrafluoroborate electrolyte of 50/50 dimethoxyethane/propylene carbonate and a cathode consisting of 83-85% by weight of Accufluor-CF$_x$ carbon fluoride, 12-13% by weight of acetylene black and 3-5% by weight of poly(tetrafluoroethylene). The cell was discharged across a 10 K ohm load corresponding to a cathodic current density of 0.36 mA/cm$^2$.

FIGS. 1-4 are plots of closed circuit voltages (CCV) versus depth of discharge (DOD) comparing the effects of voltaic performance before and after electrolyte purification.

It will be understood that variations may be made in the several conditions and ranges disclosed and that the disclosed limitations are provided primarily to better describe the invention and should not be regarded as limitations except as set forth in the claims which follow.

What is claimed is:

1. A method of purifying an organic electrolyte for use in alkali batteries, said electrolyte containing at least one contaminant metal selected from copper, nickel and iron solute and and at least one alkali metal salt solute contained in a least one organic solvent, comprising the steps of:

(a) contacting the electrolyte with a chelating resin for said contaminant metal solute which is insoluble in a stable to said organic solvent to allow sorption by coordination of the copper, nickel and/or iron solute from said solvent without allowing sorption of the alkali metal salt solute from said solvent; and p1 (b) isolating the purified electrolyte from the resin.

2. The method of claim 1 wherein the electrolyte is a lithium salt.

3. The method of claim 1 wherein said organic electrolyte is selected from the group consisting of: lactones, alkylene carbonates, lactams, polyethers, cyclic ethers, cyclic sulfones, dialkylsulfites, monocarboxylic acid esters and alkylnitriles.

4. The method of claim 3 wherein the organic solvent is γ-butyrolactone.

5. The method of claim 3 wherein the organic solvent is propylene carbonate.

6. The method of claim 3 wherein the organic solvent is N-methylpyrrolidinone.

7. The method of claim 3 wherein the organic solvent is 1,2-dimethoxyethane.

8. The method of claim 3 wherein the organic solvent is tetrahydrofuran.

9. The method of claim 3 wherein the organic solvent is sulfolane.

10. The method of claim 3 wherein the organic solvent is dimethylsulfite.

11. The method of claim 3 wherein the organic solvent is ethyl or methyl acetate.

12. The method of claim 3 wherein the organic solvent is acetonitrile.

13. The method of claim 3 wherein the organic solvent is a 50/50 mixture of propylene carbonate/dimethoxyethane.

14. The method of claim 1 where the solute is an alkali metal salt.

15. The method of claim 1 where the solute is a lithium salt of a complex metal ion.

16. The method of claim 15 wherein the preferred complex metal anion is selected from the group including tetrafluoroborate, hexafluoroarsenate, and hexafluoroantimonate.

17. The method of claim 1 wherein the organic solvent to be purified is chosen from the group consisting of lactones, alkylene carbonates, lactams, polyethers, cyclic ethers, cyclic sulfones, dialkylsulfites, monocarboxylic acid esters, and alkylnitriles and does not contain an alkali salt solute.

18. The method of claim 1 wherein the solvent or electrolyte solution is slurried with the chelating resin.

19. The method of claim 1 wherein the solvent or electrolyte solution is eluted from a column containing the chelating resin.

20. The method of claim 1 wherein the chelating resin is poly(acrylamideoxime).

* * * * *